United States Patent
Endo et al.

(10) Patent No.: US 10,754,161 B2
(45) Date of Patent: Aug. 25, 2020

(54) APPARATUS CONTROL SYSTEM

(71) Applicant: Mitsubishi Electric Corporation, Tokyo (JP)

(72) Inventors: Satoshi Endo, Tokyo (JP); Masayuki Komatsu, Tokyo (JP); Satoshi Hanai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/094,927

(22) PCT Filed: Jul. 12, 2016

(86) PCT No.: PCT/JP2016/070570
§ 371 (c)(1),
(2) Date: Oct. 19, 2018

(87) PCT Pub. No.: WO2018/011892
PCT Pub. Date: Jan. 18, 2018

(65) Prior Publication Data
US 2019/0129176 A1  May 2, 2019

(51) Int. Cl.
*G02B 27/01* (2006.01)
*G06F 3/01* (2006.01)
(Continued)

(52) U.S. Cl.
CPC .......... *G02B 27/0172* (2013.01); *G06F 3/01* (2013.01); *G06F 3/015* (2013.01); *G06F 3/017* (2013.01);
(Continued)

(58) Field of Classification Search
CPC . G06F 3/01; G06F 3/015; G06F 3/017; G06F 3/0484; G08C 17/02;
(Continued)

(56) References Cited

U.S. PATENT DOCUMENTS 7,036,094 B1 * 4/2006 Cohen ............... G06K 9/00348
715/863
9,575,561 B2 * 2/2017 Elford .................. G06F 16/957
(Continued)

FOREIGN PATENT DOCUMENTS

JP  2004-008471 A  1/2004
JP  2007-266772 A  10/2007
(Continued)

OTHER PUBLICATIONS

Extended European Search Report dated May 27, 2019 issued in corresponding European patent application No. 16908796.2.
(Continued)

*Primary Examiner* — Afroza Chowdhury
(74) *Attorney, Agent, or Firm* — Posz Law Group, PLC

(57) ABSTRACT

An apparatus control system includes smart glasses worn by a user, a home electrical apparatus that is a target of control, and a controller that controls the home electrical apparatus. In the smart glasses, a sensor detects information including at least one of image information, motion information, biological information, or environmental information. A communicator transmits to the controller the information detected by the sensor. The controller, based on the information detected by the sensor, determines a recommended operation indicating operational content recommended with respect to a recommended apparatus, and transmits the determined recommended operation to the smart glasses. The communicator receives the recommended operation transmitted from the controller. The display displays a candidate group for selection of the home electrical apparatus along with a recommended operation received from the communicator.

14 Claims, 16 Drawing Sheets

(51) Int. Cl.
*G06F 3/0484* (2013.01)
*H04L 12/28* (2006.01)
*G08C 17/02* (2006.01)

(52) U.S. Cl.
CPC ........... *G06F 3/0484* (2013.01); *G08C 17/02* (2013.01); *H04L 12/2803* (2013.01); *G02B 2027/0178* (2013.01); *G08C 2201/32* (2013.01); *G08C 2201/70* (2013.01); *G08C 2201/93* (2013.01)

(58) Field of Classification Search
CPC ............ G08C 2201/32; G08C 2201/70; G08C 2201/93; H04L 12/2803
See application file for complete search history.

(56) References Cited

U.S. PATENT DOCUMENTS

| | | | |
|---|---|---|---|
| 10,409,382 B2* | 9/2019 | Yamamoto | G06F 3/017 |
| 2007/0236381 A1 | 10/2007 | Ouchi et al. | |
| 2009/0217211 A1* | 8/2009 | Hildreth | G06F 3/0304 |
| | | | 715/863 |
| 2011/0081634 A1 | 4/2011 | Kurata et al. | |
| 2013/0077831 A1* | 3/2013 | Momozono | G06F 3/017 |
| | | | 382/107 |
| 2013/0083193 A1 | 4/2013 | Okuyama et al. | |
| 2013/0211843 A1* | 8/2013 | Clarkson | G06F 3/04883 |
| | | | 704/275 |
| 2013/0249787 A1* | 9/2013 | Morimoto | G06F 3/012 |
| | | | 345/156 |
| 2013/0304685 A1 | 11/2013 | Kurata et al. | |
| 2014/0306881 A1 | 10/2014 | Sugihara et al. | |
| 2015/0177270 A1* | 6/2015 | Takano | A61B 5/681 |
| | | | 73/514.01 |
| 2015/0215443 A1* | 7/2015 | Heo | H04M 1/0202 |
| | | | 455/556.1 |
| 2015/0241982 A1* | 8/2015 | Kim | G06F 3/04883 |
| | | | 345/156 |
| 2016/0139667 A1* | 5/2016 | Nagasaki | A61B 5/7475 |
| | | | 345/156 |

FOREIGN PATENT DOCUMENTS

| | | |
|---|---|---|
| JP | 2010-262510 A | 11/2010 |
| JP | 2011-081431 A | 4/2011 |
| JP | 2011-155957 A | 8/2011 |
| JP | 2012-146216 A | 8/2012 |
| JP | 2013-092811 A | 5/2013 |

OTHER PUBLICATIONS

International Search Report of the International Searching Authority dated Sep. 13, 2016 for the corresponding International application No. PCT/JP2016/070570 (and English translation).
Office Action dated Aug. 6, 2019 issued in corresponding JP patent application No. 2018-527291 (and English translation).

* cited by examiner

FIG. 5

| I.D. NO. | APPARATUS | LOCATION | OPERATION STATE | POWER AMOUNT | ... |
|---|---|---|---|---|---|
| 0001 | AIR CONDITIONER | LIVING ROOM | HEATING | _ kWh | ... |
| 0002 | FLOOR HEATING SYSTEM | LIVING ROOM | OFF | _ kWh | ... |
| 0003 | LIGHT | LIVING ROOM | INTERMEDIATE BRIGHTNESS | _ kWh | ... |
| 0004 | TV | LIVING ROOM | ENERGY-SAVING MODE | _ kWh | ... |
| 0005 | IH COOKER | KITCHEN | OFF | _ kWh | ... |
| 0006 | LIGHT | KITCHEN | HIGH BRIGHTNESS | _ kWh | ... |
| ... | ... | ... | ... | ... | ... |

| ORDER OF PRIORITY | APPARATUS | CONDITION 1 | CONDITION 2 | ... | RECOMMENDED OPERATION |
|---|---|---|---|---|---|
| LEVEL A | AIR CONDITIONER | HEATING PERIOD (NOV. TO MAR.) | ROOM TEMPERATURE: LESS THAN OR EQUAL TO __°C | ... | HEATING (SETTING TEMPERATURE IN PROPORTION TO SKIN TEMPERATURE) |
| LEVEL A | AIR CONDITIONER | COOLING PERIOD (JUNE TO OCT.) | ROOM TEMPERATURE: GREATER THAN OR EQUAL TO __°C | ... | COOLING (SETTING TEMPERATURE IN PROPORTION TO SKIN TEMPERATURE) |
| LEVEL B | AIR CONDITIONER | RUNNING | USED POWER AMOUNT: EXCEEDS __kWh | ... | ENERGY SAVING (ENERGY-SAVING FUNCTION ON) |
| LEVEL A | FLOOR HEATING SYSTEM | HEATING PERIOD (NOV. TO MAR.) | ROOM TEMPERATURE: LESS THAN OR EQUAL TO __°C | ... | HEATING (SETTING TEMPERATURE IN PROPORTION TO SKIN TEMPERATURE) |
| LEVEL B | FLOOR HEATING SYSTEM | RUNNING | USED POWER AMOUNT: EXCEEDS __kWh | ... | ENERGY SAVING (ENERGY-SAVING FUNCTION ON) |
| LEVEL A | LIGHT | LUMINANCE: LESS THAN OR EQUAL TO __LUX | — | ... | ON: (LUMEN SETTING IN ACCORDANCE WITH LUMINANCE) |
| LEVEL C | TV | RUNNING | USED POWER AMOUNT: EXCEEDS __kWh | ... | ENERGY SAVING (ENERGY-SAVING FUNCTION ON) |
| ... | ... | ... | ... | ... | ... |

| CONSTITUENT PATTERN | | | | APPARATUS | ADJUSTMENT CONTENT |
|---|---|---|---|---|---|
| FATHER | MOTHER | CHILD 1 | ... | | |
| PRESENT | PRESENT | PRESENT | ... | AIR CONDITIONER | DURING HEATING: −1°C<br>DURING COOLING: +1°C |
| PRESENT | PRESENT | NOT PRESENT | ... | AIR CONDITIONER | DURING HEATING: NONE<br>DURING COOLING: +1°C |
| PRESENT | NOT PRESENT | PRESENT | ... | AIR CONDITIONER | DURING HEATING: −1°C<br>DURING COOLING: NONE |
| NOT PRESENT | PRESENT | PRESENT | ... | AIR CONDITIONER | DURING HEATING: −1°C<br>DURING COOLING: +1°C |
| ... | ... | ... | ... | ... | ... |

222b

APPARATUS CONTROL SYSTEM

CROSS REFERENCE TO RELATED APPLICATION

This application is a U.S. national stage application of PCT/JP2016/070570 filed on Jul. 12, 2016, the contents of which are incorporated herein by reference.

TECHNICAL FIELD

The present disclosure relates to an apparatus control system that enables easy operation of an apparatus.

BACKGROUND ART

Wearable sensors (wearable devices) are widespread in recent years. A user wears the wearable sensor and can detect motion information such as acceleration or biological information such as pulse rate. The information detected by the wearable sensor is used for activity management or health management of the user.

Patent Literature 1 discloses an invention of a behavior condition monitoring device that is an example of conventional technology relating such a wearable sensor, and Patent Literature 2 discloses an invention of a behavior pattern analysis system.

According to the invention of Patent Literature 1, a wristwatch type behavior condition monitoring device is used to analyze activity of the user on the basis of temperature data detected by the behavior condition monitoring device, and the wristwatch type behavior condition monitoring device can provide an indication or warning to the use. According to the invention of Patent Literature 2, a motion sensor and a position sensor are used, activity and condition of the user are identified on the basis of motion information detected by the motion sensor and position information detected by the position sensor, and required information can be provided to a portable terminal.

CITATION LIST

Patent Literature

Patent Literature 1: Unexamined Japanese Patent Application Kokai Publication No. 2004-8471
Patent Literature 2: Unexamined Japanese Patent Application Kokai Publication No. 2011-81431

SUMMARY OF INVENTION

Technical Problem

Conventionally a wearable sensor is used for activity management and health management of the user, as typified by the inventions described in the aforementioned Patent Literatures 1 and 2.

Recently attempts are made to use a wearable sensor more intimately in the life of the user. For example, although various types of home electrical apparatuses are located within a home, the user is required to operate each of the home electrical apparatuses by a respective remote controller or panel. Thus convenience for the user may be considered to improve if the wearable sensor could be used to operate such home electrical apparatuses.

However, there is still no useful proposal heretofore for using the wearable sensor in the operation of home electrical apparatuses.

In order to solve the aforementioned problem, an objective of the present description is to provide an apparatus control system that enables easy performance of operation of an apparatus.

Solution to Problem

In order to attain the aforementioned objective, the apparatus control system according to the present description is an apparatus control system for controlling an apparatus in accordance with an apparatus selection selecting the apparatus from a group of candidate apparatuses and an operation selection selecting an operation from a group of candidate operations for the apparatus selected in the apparatus selection. The apparatus control system includes a sensor configured to be worn by a user and detect information including at least one of image information, motion information, biological information, or environmental information, and a display configured to display a recommended operation based on the information detected by the sensor, along with the group of candidate apparatuses.

Advantageous Effects of Invention

According to the present disclosure, the recommended operation that is recommended to the user on the basis of the information detected by the sensor is displayed, along with the candidate apparatus group, for selection of the apparatus. At this time, the selection of the apparatus and the selection of the content of the operation can be performed together by the user selecting the recommended operation, thus enabling easy performance of operation of the apparatus.

BRIEF DESCRIPTION OF DRAWINGS

FIG. 5 is a schematic drawing illustrating an example of apparatus information;
FIG. 6A is a schematic drawing illustrating an example of definition information;
FIG. 6B is a schematic drawing illustrating another example of definition information.

DESCRIPTION OF EMBODIMENTS

Figure 1:
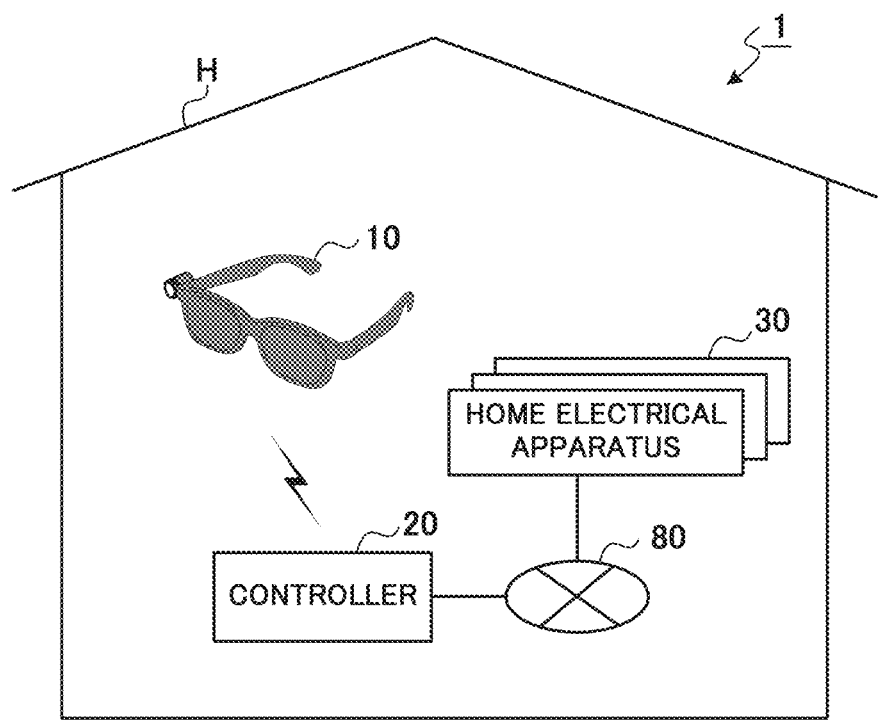
FIG. 1 is a schematic drawing illustrating an example of an overall configuration of an apparatus control system according to Embodiment 1 of the present invention.

Embodiments of the present description are described below in detail with reference to drawings. In the drawings, components that are the same or equivalent are assigned the same reference signs. Although an example case is described below in which the present description is applied to an apparatus control system within a residence, the present description can be used, as described below, in a similar manner for an apparatus control system within a building or facility. That is, the embodiments are for the explanation purpose only, and are not intended to limit the scope of the present disclosure. Hence, a person skilled in the art could adopt embodiments in which each or all elements in the explanatory embodiments are replaced with equivalents, and such embodiments are also within the scope of the present disclosure.

Embodiment 1

FIG. 1 is a schematic drawing illustrating an example of an overall configuration of an apparatus control system according to Embodiment 1 of the present invention. This apparatus control system 1 can easily operate a home electrical apparatus 30 on the basis of a gesture, such as moving the tip of a finger, of a user wearing smart glasses 10. In the apparatus control system 1 as illustrated, the smart glasses 10, a controller 20, and home electrical apparatuses 30 are disposed within a home H (residence). The controller 20 and the home electrical apparatuses 30 are connected in a communication-capable manner via a home-internal network 80 including a wired local area network (LAN) or a wireless LAN. Further, the smart glasses 10 and the controller 20 are connected in a communication-capable manner via short-distance wireless communication as typified by Bluetooth (registered trademark).

The smart glasses 10 is an example of a wearable sensor, that is, a wearable device. The user wears the smart glasses 10 in a manner similar to wearing normal glasses, views images displayed as described below in an apparatus selection screen G1 or an operation selection screen G2, and uses a gesture to input an operation, that is, make a selection. Further, the smart glasses 10 is not limited to a single set of glasses, and multiple sets of glasses may be used. For example, every member of a four-member parent-child family may have their own personal smart glasses 10, or alternatively, both parents, the father and mother, may have their own personal smart glasses 10, and the two children may be able to use the parents' smart glasses 10.

Figure 2:
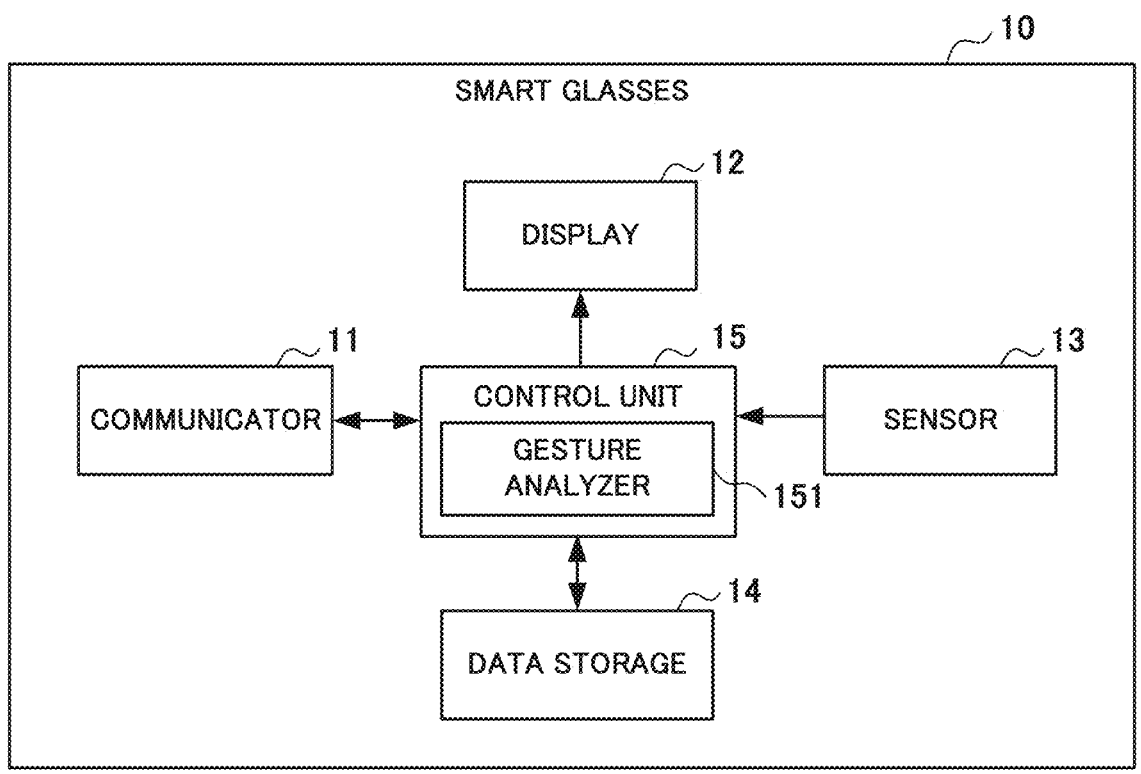
FIG. 2 is a block diagram illustrating an example of a configuration of smart glasses.

An example of a configuration of the smart glasses 10 is described below with reference to the block diagram of FIG. 2. As illustrated in the block diagram, the smart glasses 10 includes a communicator 11, a display 12, a sensor 13, a data storage 14, and a control unit 15.

The communicator 11 is a communication unit using a short-range wireless communication protocol as typified by Bluetooth (registered trademark), for example, and under command of a control unit 15, transmits required information to, and receives required information from, a controller 20. Further, if the home-internal network 80 is a wireless LAN, the communicator 11 may be a wireless unit of the wireless LAN. The communicator 11 transmits to the controller 20 sensor information (below-described image information, motion information, biological information, or environmental information) detected by the sensor 13. Further, the communicator 11 receives display information from the controller 20.

Further, a start button, to be pressed downward by the user when starting a gesture, is disposed on the smart glasses 10, and upon the user pressing this start button, the communicator 11 transmits to the controller 20 start information providing notification of the start of the gesture (operational input).

Figure 3A:
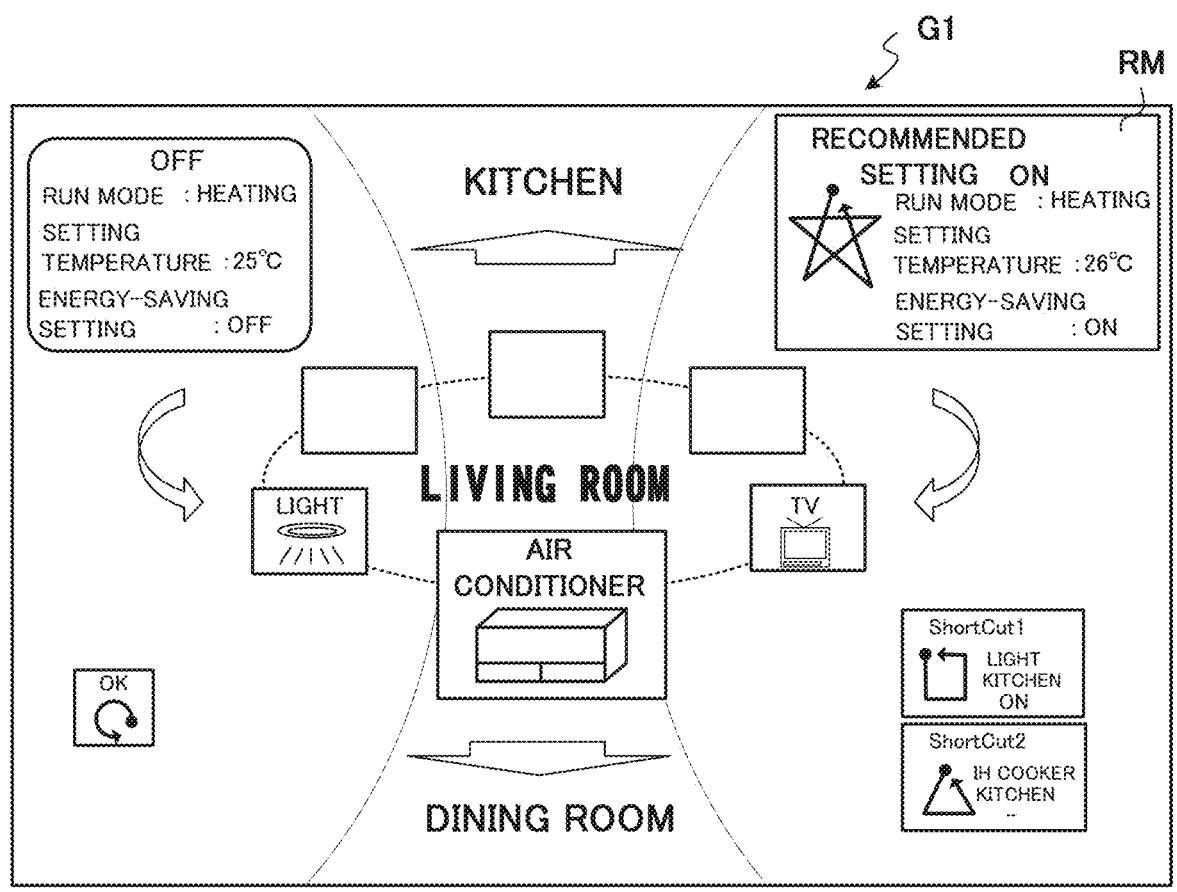
FIG. 3A is a schematic drawing illustrating an example of an apparatus selection screen.

An example of the display 12 is a color liquid crystal that displays an image that is based on the display information received by the communicator 11. That is to say, the display 12 displays the image that is based on the display information sent from the controller 20. For example, the display 12 displays the apparatus selection screen G1 as illustrated in FIG. 3A. This apparatus selection screen G1 displays a room-specific candidate apparatus group of apparatuses (home electrical apparatuses 30). The user, from among the candidate apparatus group of the apparatuses displayed on the apparatus selection screen G1, selects any apparatus as the apparatuses to be operated. Further, the apparatus selection screen G1 also includes a recommended setting RM. This recommended setting RM is recommendation information recommended to the user wearing the smart glasses 10 and indicates operational content recommended with respect to a recommended apparatus. Further, the recommended setting RM also includes content of the gesture, that is, the gesture to be performed by the user for the selection. Then if the user selects the recommended setting RM, the selection of the apparatus and the selection of the operational content can be performed together in accordance with the recommendation information.

Figure 3B:
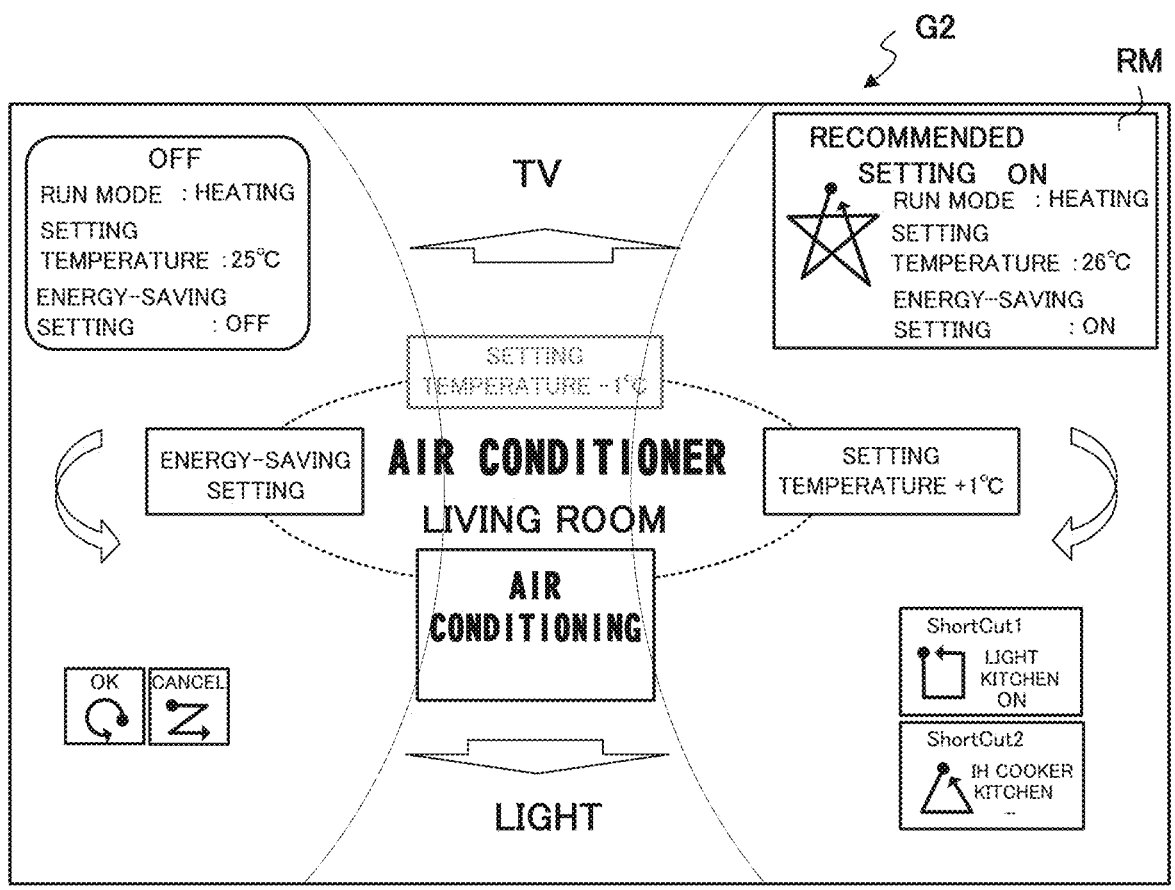
FIG. 3B is a schematic drawing illustrating an example of an operation selection screen.

The display 12 also displays the operation selection screens G2 as illustrated in FIG. 3B. The operation selection screen G2 is displayed upon selection of the apparatus in the apparatus selection screen G1. In this operation selection screen G2, a candidate group is displayed of the operational content (settings content) with respect to the selected apparatus. The user selects, from among the candidate group of the operational content displayed on the operation selection screen G2, the operational content to be designated, that is, the settings content to be changed. Further, the recommended setting RM is included in the operation selection screen G2. Thus even after selection of the apparatus to be operated, selection of the recommended operation recommended to the user (operation recommended with respect to the recommended apparatus) is possible.

Again in reference to FIG. 2, the sensor 13 detects information, for example, such as the motion information, the biological information, or the environmental information of the user wearing the smart glasses 10. Further, the sensor 13 is not limited to any single type of information, and may detect multiple types of information. For example, the sensor 13 may include a 3-axis accelerometer sensor or a 3-axis gyro sensor, and may detect motion information of the user as a value of acceleration or angular velocity. Further, the smart glasses 10 includes a camera (lens and imaging element), and this camera also functions as the sensor 13. For example, when the user performs a gesture by moving a fingertip, the camera as the sensor 13 sequentially generates (detects) image information that tracks movement of the fingertip.

Further, for example, the sensor 13 includes a heart rate sensor, a pulse sensor, a body temperature sensor, and a skin temperature sensor, and the sensor 13 detects biological information of the user such as value of a heart rate, a pulse, a body temperature, and a skin temperature, for example. In addition, the sensor 13 includes a sensor such as a temperature sensor or luminance sensor, and detects environmental information such as a value of a room temperature or luminance.

The sensor 13 transmits the sensor information, such as the image information, the motion information, the biological information, and the environmental information, to the controller 20 via the communicator 11. Further, the sensor 13 supplies the image information and the motion information also to the control unit 15 (below-described gesture analyzer 151).

The data storage 14, for example, includes non-volatile semiconductor memory, and stores various types of information required for an operation of the smart glasses 10. For example, the data storage 14 stores a correct-answer model for the gesture to be performed by the user when the aforementioned apparatus selection screen G1 of FIG. 3A or the operation selection screen G2 of FIG. 3B is displayed. That is to say, the data storage 14 stores the correct-answer model for an associated gesture for selection of an apparatus as any one of the candidate group and an associated gesture for selection of the recommended setting RM.

The control unit 15 includes components such as a central processing unit (CPU), a read-only memory (ROM), and a random access memory (RAM), and performs overall control of the smart glasses 10. The control unit 15 functions, for example, as the gesture analyzer 151. This function is achieved by the CPU using the RAM as working memory to appropriately execute a program stored in the ROM.

The gesture analyzer 151, in accordance with the image information detected by the sensor 13, analyzes the gesture performed by the user. For example, the gesture analyzer 151, on the basis of the sequentially-updated image information, tracks movement of the fingertip of the user and identifies the gesture performed by the user. Then if the identified gesture matches any of the gestures (correct-answer model) stored in the data storage 14, the gesture analyzer 151 transmits to the controller 20 via the communicator 11 indication information indicating the candidate (also including the recommended setting RM) corresponding to the matching gesture.

Further, the analysis of the gesture by the gesture analyzer 151 on the basis of the image information in this manner is one example of use of the smart glasses 10 as the wearable sensor. Thus when another type of wearable sensor is used as described below, the gesture analyzer 151 analyzes the gesture on the basis of motion information detected by the sensor 13. For example, the gesture analyzer 151 tracks the displacement of the fingertip or arm on the basis of the motion information (value of acceleration or angular velocity) detected by the sensor 13, and identifies the gesture performed by the user.

Again with reference to FIG. 1, the controller 20, in accordance with the sensor information sent from the smart glasses 10, determines the recommendation information for recommendation to the user wearing the smart glasses 10. Then the controller 20 transmits to the smart glasses 10 the display information including the determined recommendation information. Further, the controller 20 controls the home electrical appliances 30 in accordance with the indication information sent from the smart glasses 10.

Figure 4:
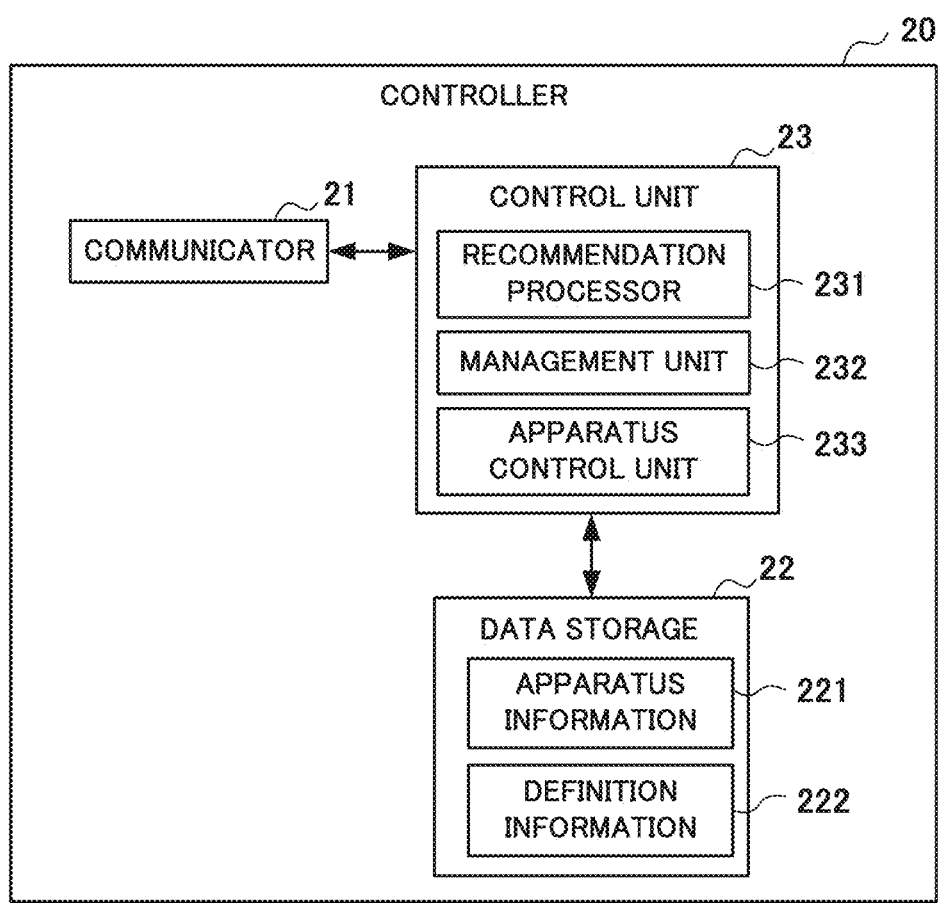
FIG. 4 is a block diagram illustrating an example of a configuration of a controller.

One example of configuration of this controller 20 is described below with reference to the block diagram of FIG. 4. As illustrated in the block diagram, the controller 20 includes a communicator 21, a data storage 22, and a control unit 23.

The communicator 21 is, for example, a multi-type communication unit using both a short-range wireless communication protocol as typified by Bluetooth (registered trademark) and a communication protocol such as wired LAN or wireless LAN, and under control of the control unit 23, exchanges information as required with the smart glasses 10 and with the home electrical apparatuses 30. For example, the communicator 21 receives the sensor information, the start information, and the indication information sent from the smart glasses 10. Further, the communicator 21 transmits the display information to the smart glasses 10. Further, the communicator 21 receives motion information and/or electric power information sent from the home electrical apparatuses 30 via the home-internal network 80, and transmits control commands to the home electrical apparatuses 30.

The data storage 22, for example, includes a non-volatile semiconductor memory and stores various types of information necessary for operation of the controller 20. For example, the data storage 22 stores apparatus information 221 for management of information of the home electrical apparatuses 30 and definition information 222 (222a and 222b) determining conditions and content of the recommendation information.

A specific example of the apparatus information 221 is illustrated in FIG. 5. The apparatus information 221 of FIG. 5 includes an identification number, the apparatus (home electrical apparatus 30), a location, an operation state, and an electric power amount. Such apparatus information 221 is used, for example, when generating the display information.

A specific example of the definition information 222 (222a and 222b) is illustrated in FIGS. 6A and 6B. The definition information 222a of FIG. 6A includes an order of priority, the apparatus (home electrical apparatus 30), conditions (condition 1, condition 2, and the like), and a recommended operation. The "order of priority" indicates a degree of priority of the corresponding item (apparatus, condition, and recommended operation) and is designated in order of descending priority as level A, B, C, and the like. For example, an item of the level B can become a target if the conditions of each level A item are not satisfied. Further, if the conditions of each level B item are not satisfied, an item of level C can become the target. The recommended operation of the item that first satisfies the item conditions becomes the recommendation information.

When multiple users are present in the room, the definition information 222b of FIG. 6B is used for adjusting the recommended operation in accordance with the composition of such users. For example, this definition information 222b is used if multiple sets of smart glasses 10 are being used, or if another user is detected to be present in the room even through only a single set of smart glasses 10 is used. That is to say, the recommendation information (recommended operation) determined by the aforementioned definition information 222a is adjusted on the basis of the definition information 222b. Further, when the user is alone in the room, the recommendation information (recommended operation) determined by the definition information 222a is used as is.

The definition information 222b of FIG. 6B includes a constituent pattern (composition of personnel), the apparatus (home electrical apparatus 30), and an adjustment content. Further, the adjustment content indicates the content of adjustment with respect to the recommendation information (recommended operation) determined by the definition information 222a. That is to say, the definition information 222a and the definition information 222b determine the recommended operation (recommendation information) of content that differs in accordance with the composition of the users.

In addition, the data storage 22 may store information such as preference information indicating preferences of the user, such as "likes low temperature and low air flow" in the case of an air conditioner (during heating-cooling), or "likes 'soft white'-colored light" in the case of a lamp, or electric power information indicating a calculated sum of electric power amounts used by the home electrical apparatus 30 or a calculated sum of electricity costs.

Again with reference to FIG. 4, the control unit 23 includes components such as the CPU, the ROM, and the RAM, and performs overall control of the controller 20. The control unit 23 functionally includes a recommendation processor 231, a management unit 232, and an apparatus control unit 233. Such functions are achieved by the CPU using the RAM as working memory to appropriately execute a program stored in the ROM, for example.

The recommendation processor 231, on the basis of the sensor information (relayed from the management unit 232) received by the communicator 21, determines the recommendation information for recommendation to the user. That is to say, the recommendation processor 231 determines the recommended operation, per the definition information 222 (definition information 222a and 222b), from the image information, the motion information, the biological information, or the environmental information sent from the smart glasses 10.

For example, the recommendation processor 231, on the basis of the biological information (such as values of heart beat, pulse, body temperature, or skin temperature), determines the recommended operation that satisfies the conditions listed in the items of the definition information 222. Further, the recommendation processor 231, on the basis of environmental information (examples include values of room temperature and luminance), determines a recommended operation that satisfies the conditions listed in the items of the definition information 222. Further, in the aforementioned manner, if multiple users are present in the room, the recommendation processor 231 further uses the definition information 222b and adjusts the recommended operation determined per the definition information 222a.

In addition, the recommendation processor 231 may determine the recommended operation on the basis of an operation state (present operation state) of the apparatus information 221. Further, if the data storage 22 stores the aforementioned preference information, the recommendation processor 231 may determine the recommendation information in order to provide the recommendation for the user on the basis of such preference information. Further, if the data storage 22 stores the aforementioned electric power information, the recommendation processor 231 may determine the recommendation information in order to provide the recommendation to the user on the basis of a comparison between such electric power information and a predetermined target electric power amount or target electricity costs.

The management unit 232 appropriately holds the start information or indication information to be received from the communicator 21, and then performs sequence management during operation. For example, upon transmission of the start information from the smart glasses 10 with pressing down of the aforementioned start button (start button pressed down by the user at the start of the gesture), the management unit 232 moves the sequence to a first stage (apparatus selection stage). In this first stage, the management unit 232 moves the sequence to a second stage (operation selection stage) if the indication information is sent and the designation content thereof is the selection of an apparatus, although if the designation content is the selection of the recommended operation (recommended setting RM), the management unit 232 shifts the sequence to a final stage (apparatus control stage). However, if the indication information is sent and the designation content thereof is the selection of an operation or the selection of the recommended operation, the management unit 232 moves the sequence to the final stage.

Further, the management unit 232 appropriately holds the sensor information received by the communicator 21 and passes (relays) the sensor information to the recommendation processor 231. Then the management unit 232 generates the display information that includes the recommendation information (recommended operation) determined by the recommendation processor 231. For example, if the sequence is in the first stage, the management unit 232 generates the display information that indicates the aforementioned apparatus selection screen G1. However, if the sequence is in the second stage, the management unit 232 generates the display information that indicates the aforementioned operation selection screen G2.

Further, upon shifting of the sequence to the final stage, the management unit 232 sends to the apparatus control unit 233 control information in accordance with the indication information. Further, the management unit 232 updates the apparatus information 221 stored in the data storage 22 in accordance with the motion information and/or electric power information of the home electrical apparatus 30 transmitted as notification from the apparatus control unit 233.

Upon receiving notification of the control information from the management unit 232, the apparatus control unit 233 generates a control command in accordance with the target home electrical appliance 30. Then the apparatus control unit 233 transmits the generated control command to the target home electrical apparatus 30 via the communicator 21. Upon arrival of a predetermined information collection timing, for example, the apparatus control unit 233 requests information from the home electrical apparatus 30 and receives the motion information and/or the electric power information sent in response to the request. Then the apparatus control unit 233 sends as notification to the management unit 232 the received motion information and/or electric power information.

Again with reference to FIG. 1, the home electrical apparatuses 30 are various types of electrified products used in various rooms within the home H, and examples of such home electrical apparatuses 30 include air conditioners, floor heating systems, lights, and televisions. Further, the types of the home electrical apparatuses 30 are not restricted to these examples, and further examples may include induction heating (IH) cookers, air purifiers, ventilation fans, and refrigerators.

Figure 7:
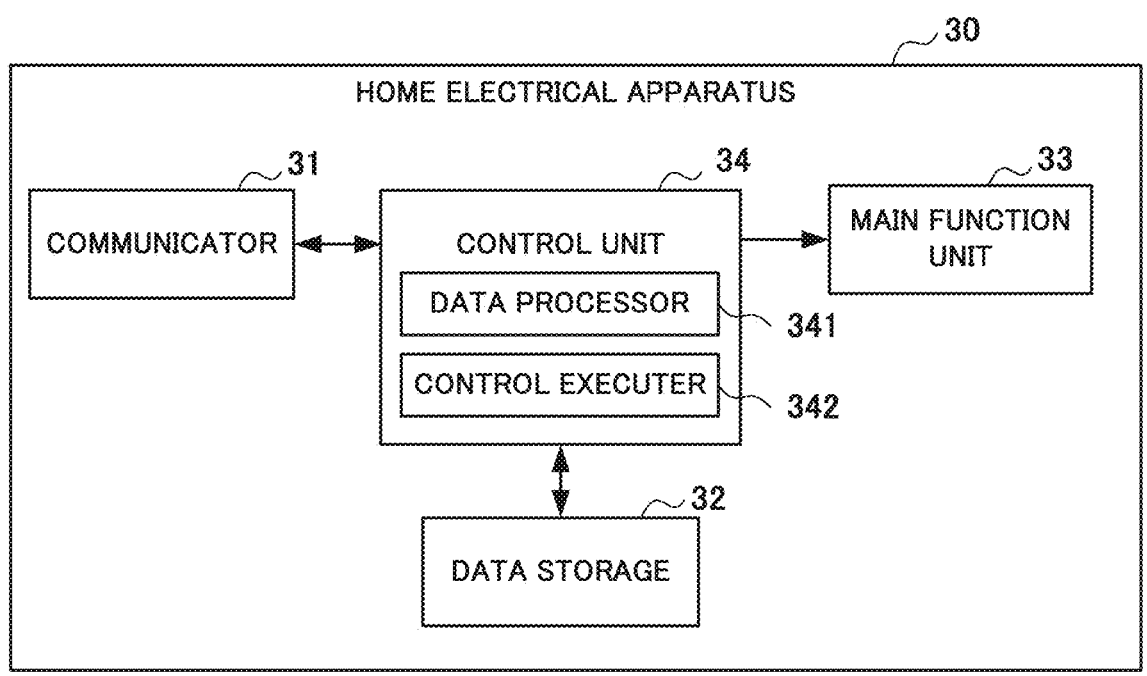
FIG. 7 is a block diagram illustrating an example of a configuration of a home electrical apparatus.

An example of configuration of such a home electrical apparatus 30 is described below with reference to the block diagram of FIG. 7. As illustrated in the block diagram, the home electrical apparatus 30 includes a communicator 31, a data storage 32, a main function unit 33, and a control unit 34.

The communicator 31 is a communication adapter for connection to, for example, the home-internal network 80, and performs communication with the controller 20 via the home-internal network 80 under the control of the control unit 34. Further, the communicator 31 may be configured as an attachable-detachable external communication adapter.

The data storage 32 includes, for example, non-volatile semiconductor memory, and stores information (examples include the operational status, a run mode, and the electric power amount) indicating the status of the home electrical apparatus 30.

The main function unit 33 is configured in order to achieve the original function of the home electrical apparatus 30, such as an air-conditioning function of cooling or heating in the case of an air conditioner, and is controlled by the control unit 34.

The control unit 34 includes components such as the CPU, the RAM, and the ROM, and performs overall control of the home electrical apparatus 30. The control unit 34 functionally includes a data processor 341 and a control executer 342. Such functions are achieved by the CPU using the RAM as a working memory to appropriately execute a program stored in the ROM or the data storage 32.

The data processor 341 sequentially updates the information stored in the data storage 32 on the basis of information such as measurement values of sensors with which the home electrical apparatus 30 is equipped, or results of monitoring the operation state or a setting state. Then the data processor 341, in accordance with the request from the controller 20, transmits to the controller 20 the information stored in the data storage 32.

Upon the communicator 31 receiving the control command sent from the controller 20, the control executer 342 causes the main function unit 33 to execute control on the basis of the received control command.

Figure 8:
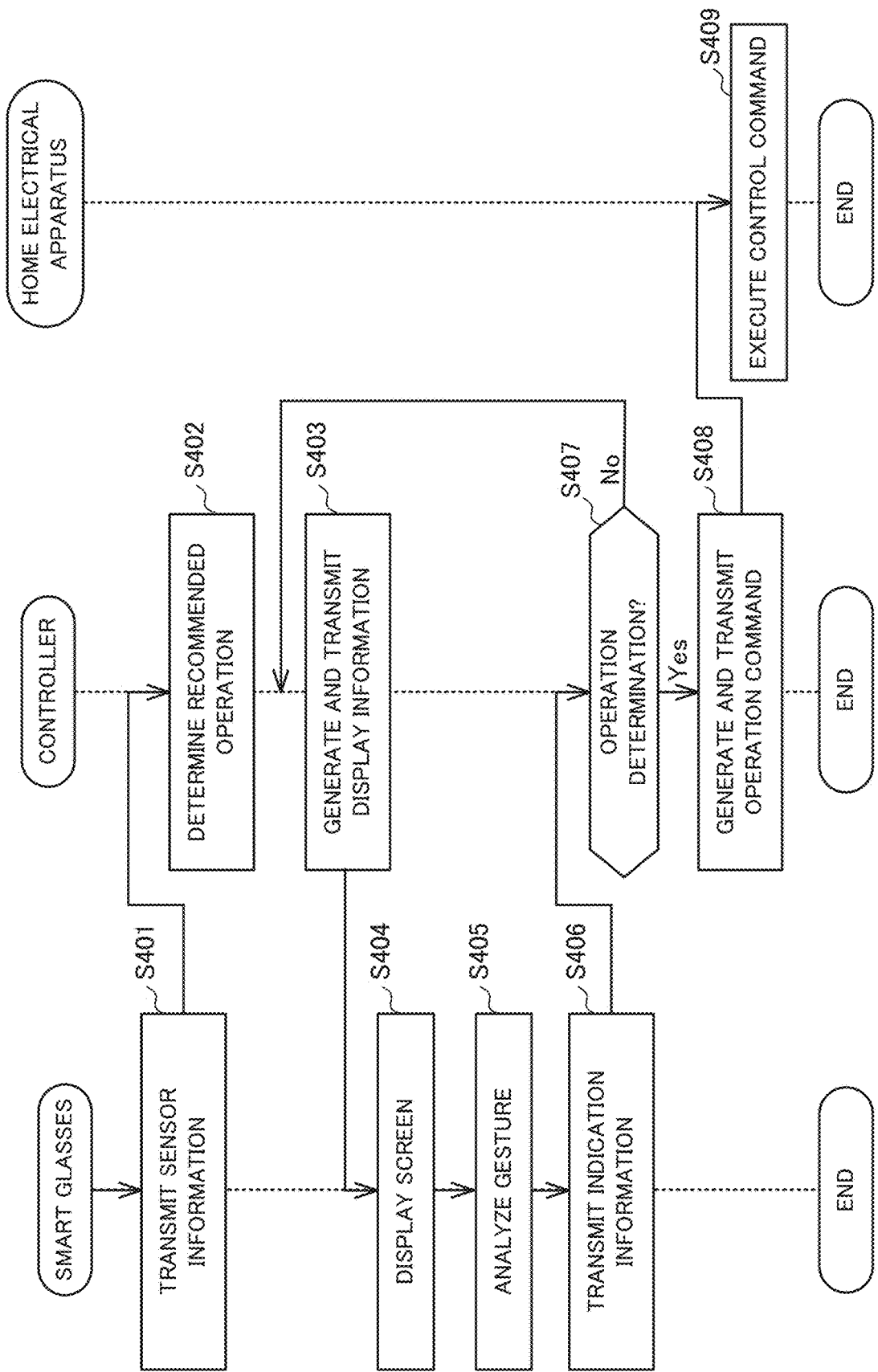
FIG. 8 is a flowchart illustrating an example of apparatus control processing.

Operation of the apparatus control system 1 according to Embodiment 1 of the present description is described below with reference to FIG. 8. FIG. 8 is a flowchart illustrating an example of the apparatus control processing. This apparatus control processing begins, for example, when the user presses down the start button of the smart glasses 10. Further, with the pressing down of the start button, the start information is transmitted from the smart glasses 10 to the controller 20.

Firstly, the smart glasses 10 transmits the sensor information to the controller 20 (step S401). That is, the sensor 13 detects the motion information, the biological information, or the environmental information of the user wearing the smart glasses 10. Then the communicator 11 transmits this sensor information to the controller 20.

The controller 20, on the basis of the sent sensor information, determines the recommended operation (step S402). That is, the recommendation processor 231, on the basis of the sensor information, determines the recommendation information for recommendation to the user. That is, the recommendation processor 231 determines the recommended operation determined per the definition information 222 (definition information 222*a* and 222*b*) on the basis of the image information, the motion information, the biological information, or the environmental information sent from the smart glasses 10.

For example, the recommendation processor 231, on the basis of the biological information (such as the value of heart beat, pulse, body temperature, or skin temperature), determines the recommended operation that satisfies the conditions listed in the items of the definition information 222. Further, the recommendation processor 231, on the basis of environmental information (examples include values of room temperature and luminance), determines a recommended operation that satisfies the conditions listed in the items of the definition information 222. Further, if multiple users are present in the room, the recommendation processor 231 further uses the definition information 222*b* and adjusts the recommended operation determined per the definition information 222*a*. Further, if the data storage 22 stores the aforementioned preference information, the recommendation processor 231 may determine the recommendation information in order to provide the recommendation for the user on the basis of such preference information. Further, if the data storage 22 stores the aforementioned electric power information, the recommendation processor 231 may determine the recommended operation in order to provide the recommendation to the user on the basis of a comparison between such electric power information and a predetermined target electric power amount or target electricity costs.

The controller 20 generates the display information and sends the generated display information to the smart glasses 10 (step S403). That is, the management unit 232 generates the display information that includes the recommended operation determined in step S402. Further, the management unit 232 performs the sequence management and, for example, generates the display information denoting the apparatus selection screen G1 if the sequence is in the first stage, and generates the display information denoting the operation selection screen G2 if the sequence is in the second stage. Then the communicator 21 transmits such display information to the smart glasses 10.

The smart glasses 10 displays a screen (step S404) that is based on the transmitted display information. That is, the display 12 displays the operation selection screen G1 as illustrated in FIG. 3A, or alternatively, displays the operation selection screen G2 as illustrated in FIG. 3B.

Upon the user viewing such a screen and performing a gesture, the smart glasses 10 analyzes the gesture (step S405). That is, the gesture analyzer 151, in accordance with the image information detected by the sensor 13, analyzes the gesture performed by the user. For example, the gesture analyzer 151 tracks movement of the fingertip of the user on the basis of the sequentially updated image information, and identifies the gesture performed by the user. Further, the analysis of the gesture by the gesture analyzer 151 on the basis of the image information in this manner is one example of use of the smart glasses 10 as the wearable sensor. Thus when another type of wearable sensor is used as described below, the gesture analyzer 151 analyzes the gesture on the basis of motion information detected by the sensor 13. For example, the gesture analyzer 151 tracks the displacement of the fingertip or arm on the basis of the motion information (value of acceleration or angular velocity) detected by the sensor 13, and identifies the gesture performed by the user.

If the gesture of the user analyzed in step S405 matches a correct-answer model, the smart glasses 10 transmits the indication information to the controller 20 (step S406). That is, if the determined gesture matches any of the gestures (correct-answer models) stored in the data storage 14, the gesture analyzer 151 transmits to the controller 20 via the communicator 11 the indicating information indicating the candidate (including the recommended setting RM) associated with the matching gesture.

The controller 20 determines whether the transmitted indication information is an operation determination (step S407). That is, the management unit 232 performing the sequence management determines that the transmitted indication information is an operation determination if: when in the first stage, the indication information is a selection of the recommended operation (recommended setting RM), or when the sequence is in the second stage, the indication information is selection of an operation or selection of the recommended operation.

Upon determination that the transmitted indication information is not the operation determination (NO in step S407), the controller 20 returns the processing to the aforementioned step S403. In this step S403, the screen image is generated in accordance with the sequence management, and again the generated screen image is transmitted to the smart glasses 10.

However, upon determination that the transmitted indication information is the operation determination (YES in step S407), the controller 20 generates the operation command, and transmits the generated operation command to the home electrical apparatus 30 (step S408). That is, upon transmission of the control information as notification from the management unit 232, the apparatus control unit 233 generates the control command in accordance with the targeted home electrical apparatus 30. Further, the communicator 21 transmits the operation command to the targeted home electrical apparatus 30.

The home electrical apparatus 30 executes the transmitted control command (step S409). That is, upon receiving via the communicator 31 the control command transmitted from the controller 20, the control executer 342 causes the main function unit 33 to execute control on the basis of the received control command.

In such apparatus control processing, on the basis of the sensor information detected by the sensor 13, the recommended operation recommended to the user, along with the candidate group for selection of the apparatus, is displayed on the display 12 of the smart glasses 10. Then by the user selected the recommended operation, the selection of the apparatus and the selection of the operational content can be performed together, and the apparatus can be easily operated.

Relationships between major components of the apparatus control system 1 (specifically, the smart glasses 10 and the controller 20) are described with reference to FIG. 9.

Figure 9:
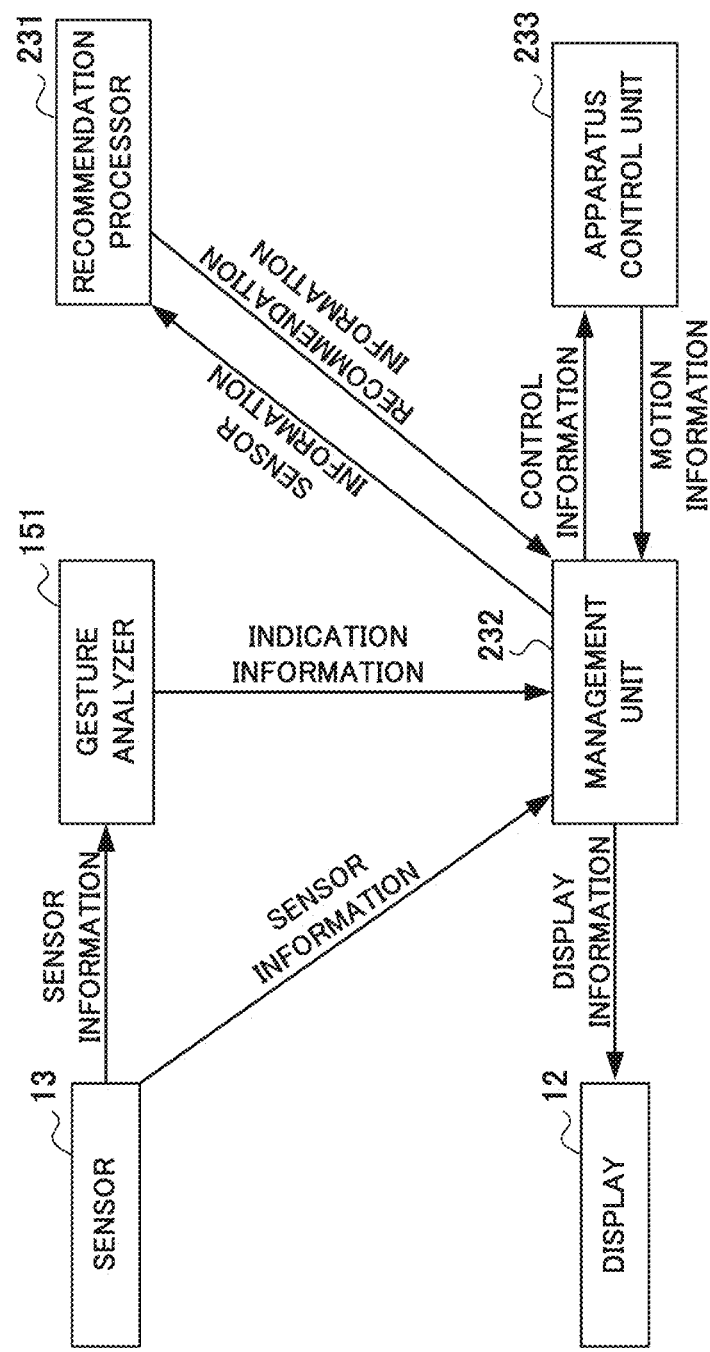
FIG. 9 is an relationship diagram for a description of relationships of a main configuration.

As illustrated in the relationship diagram of FIG. 9, the sensor information (the image information, the motion information, the biological information, or the environmental information) detected by the sensor 13 is transmitted to the management unit 232. The sensor information transmitted to the management unit 232 is transmitted to the recommendation processor 231. The recommendation processor 231, on the basis of the sensor information, generates the recommendation information (recommended operation) and sends the generated recommendation information to the management unit 232. Then the management unit 232 transmits to the display 12 the display information that includes the recommendation information.

Further, the sensor information (image information or motion information) detected by the sensor 13 is transmitted also to the gesture analyzer 151. The gesture analyzer 151, on the basis of the sensor information, analyzes the gesture performed by the user. Then when the gesture performed by the user matches the correct-answer model, the indication information is transmitted to the management unit 232.

If the transmitted indication information is the operation determination, then the management unit 232 transmits the control information to the apparatus control unit 233. Further, the apparatus control unit 233, on the basis of the transmitted control information, generates the control command and transmits the generated control command to the targeted home electrical apparatus 30. Further, the apparatus control unit 233 transmits to the management unit 232 the motion information transmitted from the home electrical apparatus 30.

If these relationships of the main configuration are maintained in this way, the aforementioned operation is possible whatever the devices that are present in such major configuration. Thus as described below, the apparatus control system 1 can be achieved even when using a different configuration of devices.

Embodiment 2

Figure 10:
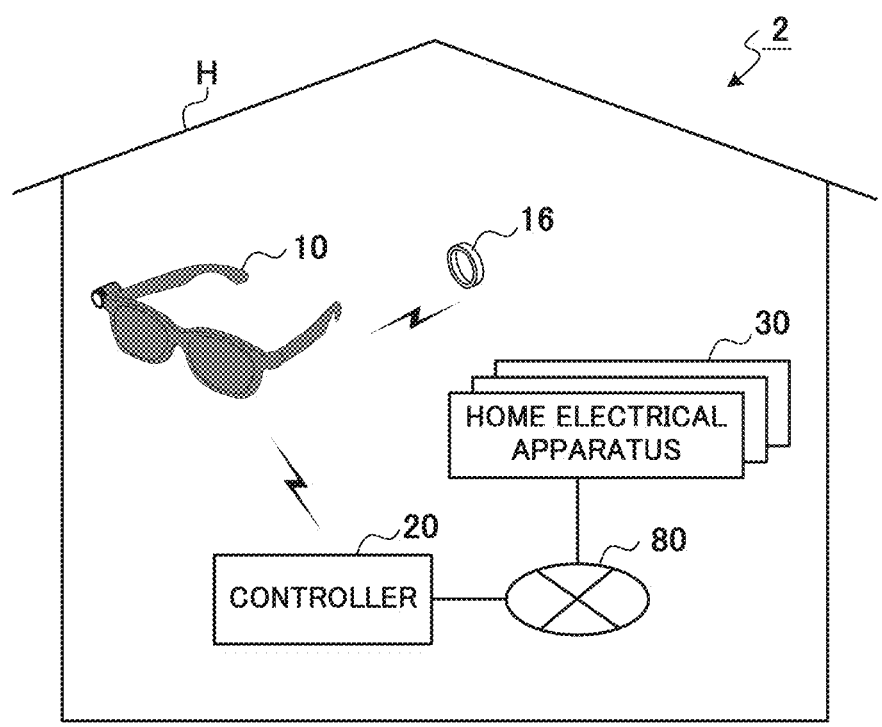
FIG. 10 is a schematic drawing illustrating an example of an overall configuration of an apparatus control system according to Embodiment 2 of the present description.

FIG. 10 is a schematic drawing illustrating an example of overall configuration of an apparatus control system 2 according to Embodiment 2 of the present invention. This apparatus control system 2 differs from the apparatus control system 1 of FIG. 1 in that a ring-type sensor terminal 16, for example, is added to the apparatus control system 2.

The sensor terminal 16 is an example of the wearable sensor. The user wears the sensor terminal 16 on the finger that performs the gesture. This sensor terminal 16 includes the sensor 13 illustrated in the aforementioned relationship diagram of FIG. 9. For example, the sensor 13 is equipped with a 3-axis accelerometer or a 3-axis gyro sensor, and detects motion information (examples include values of acceleration and angular velocity) of the user. Further, the sensor terminal 16 is equipped with a communication unit using a short-range wireless communication protocol as typified by Bluetooth (registered trademark), and the motion information detected by the sensor 13 is transmitted to the smart glasses 10.

The smart glasses 10 is equipped with the gesture analyzer 151 illustrated in the relationship diagram of FIG. 9, and on the basis of the motion information (that is, the motion information detected by the sensor 13) transmitted form the sensor terminal 16, performs analysis of the gesture performed by the user. For example, the gesture analyzer 151 tracks the displacement of the fingertip or arm on the basis of the motion information (value of acceleration or angular velocity) detected by the sensor 13, and identities the gesture performed by the user. Then if the identified gesture matches any gesture (correct-answer model) stored in the data storage 14, the gesture analyzer 151 transmits to the controller 20 via the communicator 11 the indication information indicating the candidate (also including the recommended setting RM) associated with the matching gesture.

Further, the smart glasses 10 is equipped with the display 12 illustrated in the relationship diagram of FIG. 9, and displays the screen (such as the apparatus selection screen G1 or the operation selection screen G2) on the basis of the display information transmitted from the controller 20.

This controller 20 is similar to the controller 20 of the apparatus control system 1 of FIG. 1. That is, the controller 20 is equipped with the recommendation processor 231, the management unit 232, and the apparatus control unit 233 illustrated in the relationship diagram of FIG. 9.

That is, the apparatus control system 2 also maintains the relationships of the major configuration illustrated in the relationship diagram of FIG. 9, and the user can easily operate the home electrical apparatus 30.

Embodiment 3

Figure 11:
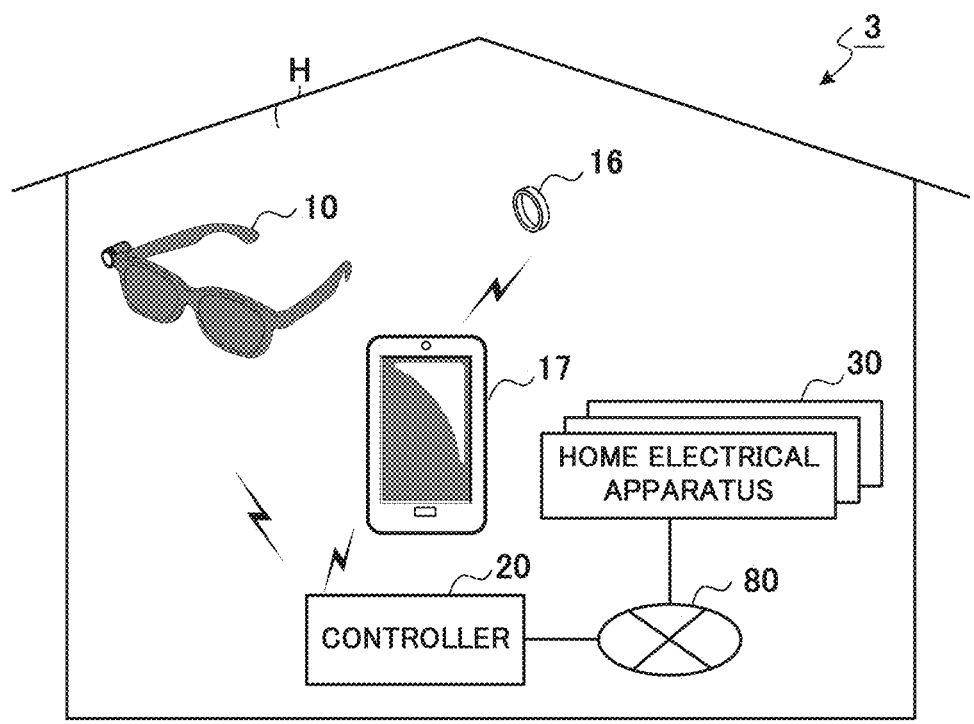
FIG. 11 is a schematic drawing illustrating an example of an overall configuration of an apparatus control system according to Embodiment 3 of the present description.

FIG. 11 is a schematic drawing illustrating an example of overall configuration of an apparatus control system 3 according to Embodiment 3 of the present description.

This apparatus control system 3 differs from the apparatus control system 2 of FIG. 10 in that a smart phone 17, for example, is added to the apparatus control system 3.

The sensor terminal 16 is similar to the sensor terminal 16 illustrated in the apparatus control system 2 of FIG. 10. That is, the apparatus control system 3 is equipped with the sensor 13 illustrated in the relationship diagram of FIG. 9. Further, the sensor terminal 16 of the apparatus control system 3 transmits the motion information detected by the sensor 13 to the smart phone 17.

The smart phone 17 is equipped with the gesture analyzer 151 illustrated in the relationship diagram of FIG. 9, and analyzes the gesture performed by the user on the basis of the motion information (that is, the motion information detected by the sensor 13) sent from the sensor terminal 16. For example, the gesture analyzer 151 tracks the displacement of the fingertip or arm on the basis of the motion information (value of acceleration or angular velocity) detected by the sensor 13, and identifies the gesture performed by the user. Then if the identified gesture matches any gesture (correct-answer model) stored in the data storage of the gesture analyzer 151, the gesture analyzer 151 transmits to the controller 20 via the communication unit the indication information indicating the candidate (also including the recommended setting RM) associated with the matching gesture.

The smart glasses 10 is equipped with the display 12 illustrated in the relationship diagram of FIG. 9, and displays the screen (such as the apparatus selection screen G1 or the operation selection screen G2) on the basis of the display information transmitted from the controller 20.

This controller 20 is similar to that of the apparatus control system 1 of FIG. 1. That is, the controller 20 is equipped with the recommendation processor 231, the management unit 232, and the apparatus control unit 233 illustrated in the relationship diagram of FIG. 9.

That is, the apparatus control system 3 also maintains the relationships of the major configuration illustrated in the relationship diagram of FIG. 9, and the user can easily operate the home electrical apparatus 30.

Embodiment 4

Figure 12:
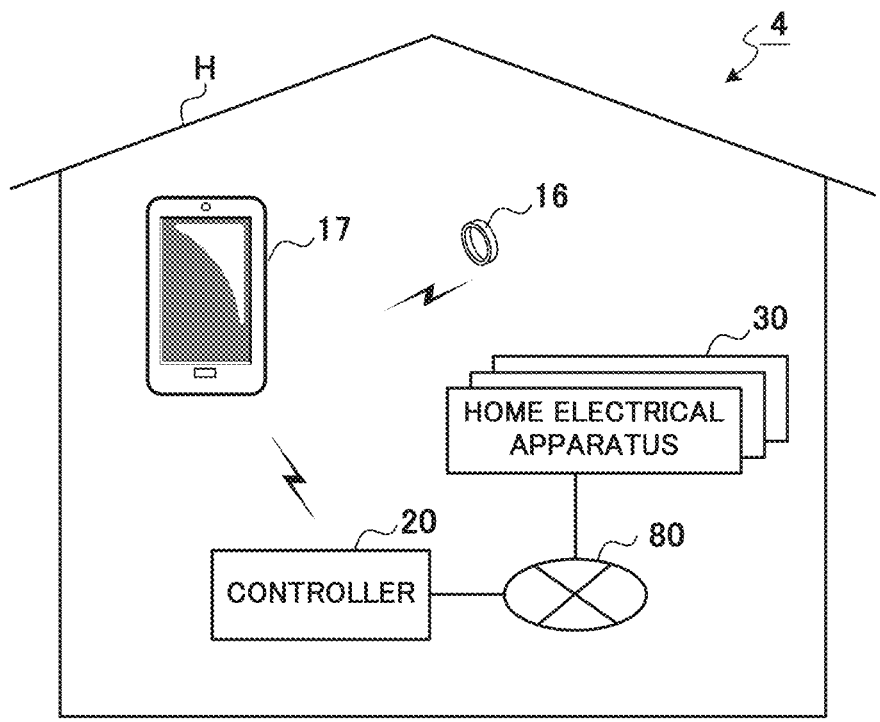
FIG. 12 is a schematic drawing illustrating an example of an overall configuration of an apparatus control system according to Embodiment 4 of the present description.

FIG. 12 is a schematic drawing illustrating an example of overall configuration of an apparatus control system 4 according to Embodiment 4 of the present description. This apparatus control system 4 differs from the apparatus control system 2 of FIG. 10 in that the apparatus control system 4 is equipped with the smart phone 17 rather than the smart glasses 10.

The sensor terminal 16 is similar to the sensor terminal 16 of the apparatus control system 2 illustrated in FIG. 10. That is to say, the apparatus control system 4 is equipped with the sensor 13 of the relationship diagram illustrated in FIG. 9. Further, the sensor terminal 16 of the apparatus control system 4 transmits to the smart phone 17 the motion information detected by the sensor 13.

The smart phone 17 is equipped with the gesture analyzer 151 of the relationship diagram illustrated in FIG. 9, and analyzes the gesture performed by the user on the basis of the motion information (that is, the motion information detected by the sensor 13) sent from the sensor terminal 16. For example, the gesture analyzer 151 tracks the displacement of the fingertip or arm on the basis of the motion information (value of acceleration or angular velocity) detected by the sensor 13, and identifies the gesture performed by the user. Then if the identified gesture matches any gesture (correct-answer model) stored in the data storage of the gesture analyzer 151, the gesture analyzer 151 transmits to the controller 20 via the communication unit the indication information indicating the candidate (also including the recommended setting RM) associated with the matching gesture.

Further, the smart phone 17 is equipped with the display 12 illustrated in the relationship diagram of FIG. 9, and displays the screen (such as the apparatus selection screen G1 or the operation selection screen G2) on the basis of the display information transmitted from the controller 20.

This controller 20 is similar to the controller 20 of the apparatus control system 1 of FIG. 1. That is, the controller 20 is equipped with the recommendation processor 231, the management unit 232, and the apparatus control unit 233 illustrated in the relationship diagram of FIG. 9. Further, the management unit 232 transmits the generated display information to the smart phone 17.

That is, the apparatus control system 4 also maintains the relationships of the major configuration illustrated in the relationship diagram of FIG. 9, and the user can easily operate the home electrical apparatus 30.

Embodiment 5

Figure 13:
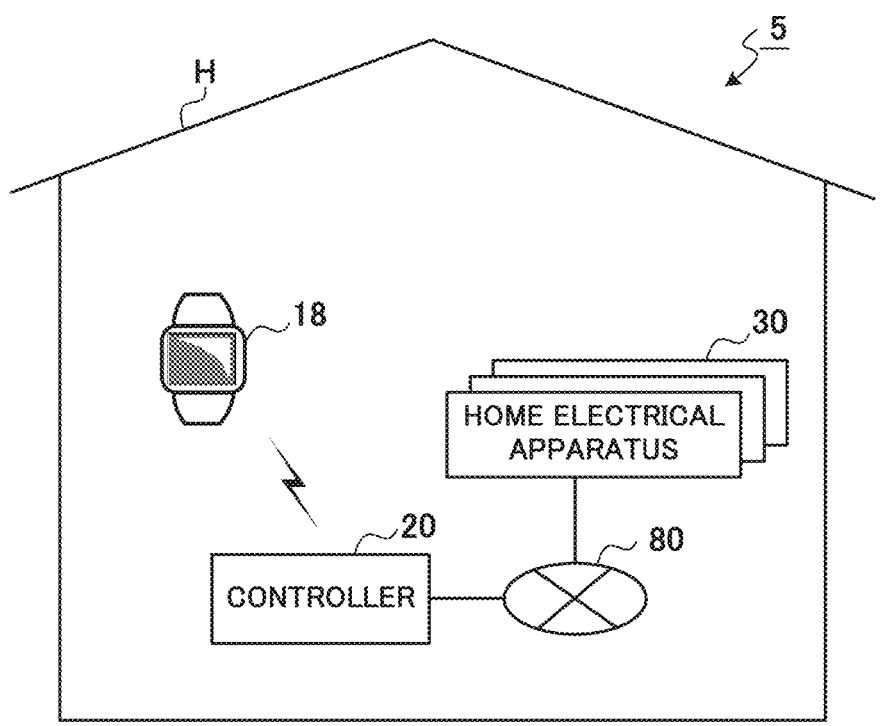
FIG. 13 is a schematic drawing illustrating an example of an overall configuration of an apparatus control system according to Embodiment 5 of the present description.

FIG. 13 is a schematic drawing illustrating an example of overall configuration of an apparatus control system 5 according to Embodiment 5 of the present description. This apparatus control system 5 differs from the apparatus control system 1 of FIG. 1 in that the apparatus control system 5 is equipped with a smart watch 18 rather than the smart glasses 10.

The smart watch 18 is an example of the wearable sensor. The user wears the smart watch 18 on the arm performing the gesture. The smart watch 18 is equipped with the sensor 13 illustrated in the relationship diagram of FIG. 9. For example, the sensor 13 is equipped with a 3-axis accelerometer or a 3-axis gyro sensor, and detects the motion information (examples include values of acceleration and angular velocity) of the user.

Further, the smart watch 18 is equipped with the gesture analyzer 151 of the relationship diagram illustrated in FIG. 9, and analyzes the gesture performed by the user on the basis of the motion information detected by the sensor 13. For example, the gesture analyzer 151 tracks the displacement of the fingertip or arm on the basis of the motion information (value of acceleration or angular velocity) detected by the sensor 13, and identifies the gesture performed by the user. Then if the identified gesture matches any gesture (correct-answer model) stored in the data storage of the gesture analyzer 151, the gesture analyzer 151 transmits to the controller 20 via the communication unit the indication information indicating the candidate (also including the recommended setting RM) associated with the matching gesture.

Further, the smart watch 18 is equipped with the display 12 illustrated in the relationship diagram of FIG. 9, and displays the screen (such as the apparatus selection screen G1 or the operation selection screen G2) on the basis of the display information transmitted from the controller 20.

This controller 20 is similar to the controller 20 of the apparatus control system 1 of FIG. 1. That is, the controller 20 is equipped with the recommendation processor 231, the management unit 232, and the apparatus control unit 233 illustrated in the relationship diagram of FIG. 9. Further, the management unit 232 transmits the generated display information to the smart watch 18.

That is, the apparatus control system 5 also maintains the relationships of the major configuration illustrated in the relationship diagram of FIG. 9, and the user can easily operate the home electrical apparatus 30.

In this manner, the apparatus control systems 1-5 of different device configurations maintain the relationships of the main configuration of the relationship diagram illustrated in FIG. 9. Further, even though the device configuration of the apparatus control systems 1-5 remains the same, a different device may be provided in a portion of the main configuration of FIG. 9.

For example, in the aforementioned apparatus control system 2 according to Embodiment 2 of the present description, although the smart glasses 10 is equipped with the gesture analyzer 151 of the relationship diagram illustrated in FIG. 9, another device may be equipped with the gesture analyzer 151. For example, even if the controller 20 is equipped with the gesture analyzer 151, as long as the relationships of the main configuration of the relationship diagram illustrated in FIG. 9 are maintained, the user in the same manner can easily operate the home electrical apparatus 30.

Modified Example

Although the controller 20 is described as being disposed within the home H in the aforementioned apparatus control systems 1-5 according to Embodiments 1-5, a device corresponding to the controller 20 may be disposed outside the home H. For example, a server 60 on the Internet may function as the controller 20.

Figure 14:
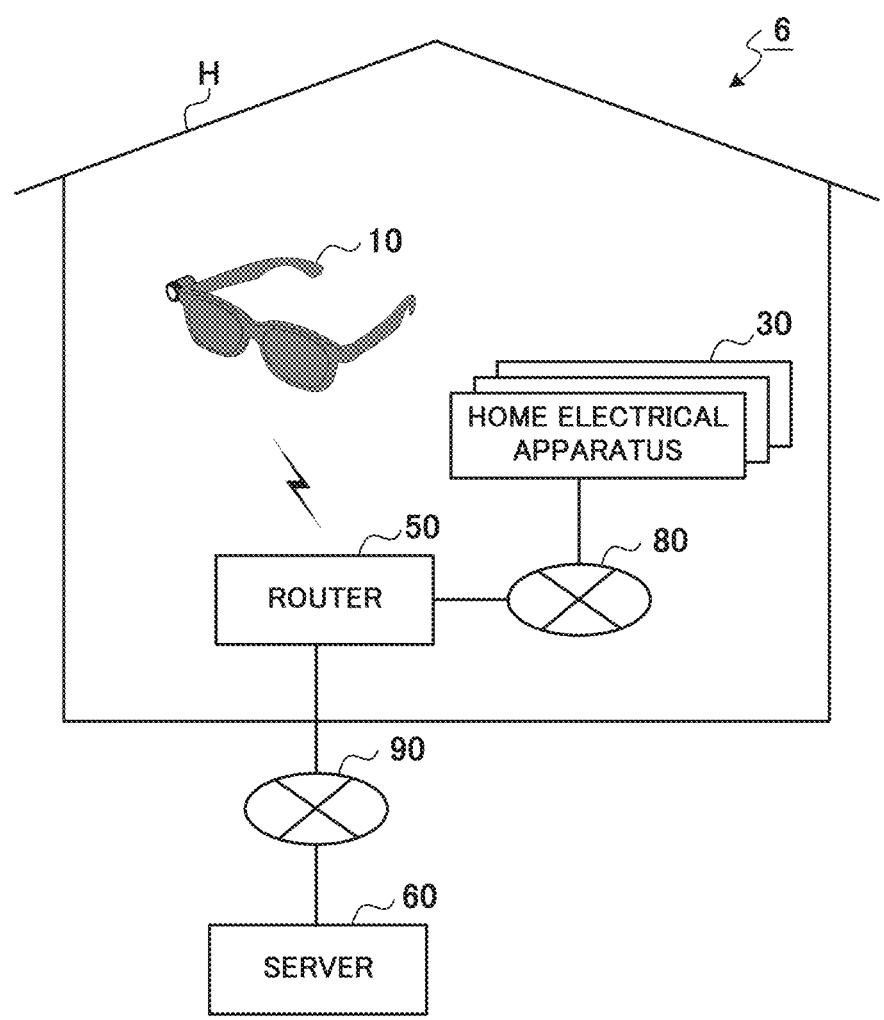
FIG. 14 is a schematic drawing illustrating an example of an overall configuration of an apparatus control system according to a Modified Example of the present description.

For example, in an apparatus control system 6 illustrated in FIG. 14, a router 50, rather than the controller 20, is disposed within the home H. However, a server 60 on a home-external network 90 functions as the aforementioned controller 20. In this case, the role of the controller 20 is performed cooperatively by both the router 50 and the server 60.

Also in this case, the relationships of the main configuration of the relationship diagram illustrated in FIG. 9 are maintained, and the user can easily operate the home electrical apparatus 30.

Other Embodiments

Although the aforementioned embodiments describe in-home apparatus control systems 1-6, the present description can be used similarly for apparatus control systems 1-6 used in a building or facility.

Although the aforementioned embodiments describe the use of a dedicated controller 20, a personal computer or the like can be made to function as the controller 20 according to the present description by application of an operation program specifying operation of the controller 20 to an existing personal computer, terminal apparatus, or the like.

Further, any method may be used for distribution of such a program, and for example, the program may be stored in a computer-readable recording medium such as a compact disc read-only memory (CD-ROM), a digital versatile disc (DVD), a magneto-optical (MO) disc, a memory card, or the like, and the computer-readable recording medium storing the program may be distributed through a communication network such as the Internet.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure may be used for an apparatus control system that enables easy operation of an apparatus.

REFERENCE SIGNS LIST 1-6 Apparatus control system
10 Smart glasses
11, 21, 31 Communicator
12 Display
13 Sensor
14, 22, 32 Data storage
15, 23, 34 Control unit
151 Gesture analyzer
16 Sensor terminal
17 Smart phone
18 Smart watch
20 Controller
221 Apparatus information
222 (222a, 222b) Definition information
231 Recommendation processor
232 Management unit
233 Apparatus control unit
30 Home electrical apparatus
33 Main function unit
341 Data processor
342 Control executer
50 Router
60 Server
80 Home-internal network
90 Home-external network

The invention claimed is:

1. An apparatus control system for controlling an apparatus in accordance with an apparatus selection selecting the apparatus from a group of candidate apparatuses and an operation selection selecting an operation from a group of candidate operations for the apparatus selected in the apparatus selection, the apparatus control system comprising:
  a sensor configured to be worn by a user and detect information including biological information; and
  a display configured to, in a state in which the apparatus is not selected, display (i) a recommended operation that is determined based on the information detected by the sensor and that is presented to the user, along with (ii) the group of candidate apparatuses, the recommended operation indicating a gesture that is to be performed by the user.

2. The apparatus control system according to claim 1, wherein the sensor further detects information including at least one of image information, motion information, or environmental information, the apparatus control system further comprises a recommendation processor configured to, based on the information detected by the sensor, determine the recommended operation indicating operational content recommended with respect to a recommended apparatus, and the display displays the recommended operation determined by the recommendation processor.

3. The apparatus control system according to claim 2, further comprising:

a storage configured to store definition information that determines a recommended operation having content that differs in accordance with a composition of users, wherein the recommendation processor identifies the composition of users in a room based on the information detected by the sensor, and determines the recommended operation in accordance with the identified composition of users and the definition information.

4. The apparatus control system according to claim 2, wherein the recommended operation displayed on the display is associated with a predetermined gesture, and the apparatus control system further comprises:

a gesture analyzer configured to analyze a gesture performed by the user based on the image information or the motion information detected by the sensor, and an apparatus control unit configured to, upon the analyzed gesture matching the gesture associated with the recommended operation, cause a target apparatus to perform a motion corresponding to the recommended operation.

5. The apparatus control system according to claim 2, wherein the sensor detects as the biological information at least one of a pulse, a heart rate, a body temperature, or a skin temperature, and the recommendation processor determines the recommended operation indicating the operational content recommended with respect to an air conditioner based on the at least one of the pulse, the heart rate, the body temperature, or the skin temperature detected by the sensor.

6. The apparatus control system according to claim 2, wherein the sensor detects a luminance as the environmental information, and the recommendation processor determines the recommended operation indicating the operational content recommended with respect to a lighting apparatus based on the light intensity detected by the sensor.

7. The apparatus control system according to claim 2, further comprising:

a storage configured to store preference information indicating preferences that differ in accordance with the user, wherein the recommendation processor, based on the preference information, determines the recommended operation recommended to a user wearing the sensor.

8. The apparatus control system according to claim 2, further comprising:

a storage configured to store apparatus information indicating operation statuses of the apparatus, wherein the recommendation processor determines the recommended operation based on a present operation state corresponding to the apparatus information.

9. The apparatus control system according to claim 2, further comprising:

a storage configured to store electric power information indicating a calculated sum of electric power amounts used by the apparatus or a calculated sum of electricity costs, and the recommendation processor determines the recommended operation based on a comparison between the electric power information and a predetermined target electric power amount or a predetermined target electricity cost.

10. The apparatus control system according to claim 1, wherein the candidate apparatuses are home electrical appliances and the apparatus is one of the home electrical appliances, the biological information is information of the user wearing the sensor, the apparatus control system further comprises a controller, and the controller is configured to:

receive the biological information transmitted from the sensor;

determine the recommended operation with respect to the home electrical appliance to display to the user, based on the received biological information;

receive a selected recommended operation, responsive to selection by the user of the displayed recommended operation; and control the home electrical appliance corresponding to the selected recommended operation, in accordance with the selected recommended operation.

11. The apparatus control system according to claim 1, wherein the sensor is a wearable sensor configured to be incorporated into smart glasses.

12. The apparatus control system according to claim 1, wherein the sensor is a wearable sensor configured for use with a smart phone or a smart watch.

13. The apparatus control system according to claim 10, wherein the home electrical apparatus is one or more of an air conditioner, a floor heating system, a home light, a television, a cooker, an air purifier, a fan, or a refrigerator.

14. The apparatus control system according to claim 10, wherein the information detected by sensor further includes motion information indicating a motion of the user, and wherein the controller is further configured to analyze a gesture of the user according to the motion information, as selection by the user with respect to the displayed recommended operation.

* * * * *